United States Patent
Pelegrino et al.

(10) Patent No.: US 11,922,179 B2
(45) Date of Patent: Mar. 5, 2024

(54) MIGRATING SOFTWARE AND SYSTEM SETTINGS BETWEEN COMPUTING ENVIRONMENTS

(71) Applicant: RED HAT, INC., Raleigh, NC (US)

(72) Inventors: Julio Enrique Villarreal Pelegrino, Pflugerville, TX (US); Andrew J. Huffman, New Braintree, MA (US)

(73) Assignee: RED HAT, INC., Raleigh, NC (US)

( * ) Notice: Subject to any disclaimer, the term of this patent is extended or adjusted under 35 U.S.C. 154(b) by 380 days.

(21) Appl. No.: 16/809,100

(22) Filed: Mar. 4, 2020

(65) Prior Publication Data
US 2021/0279076 A1    Sep. 9, 2021

(51) Int. Cl.
| | |
|---|---|
| G06F 9/44 | (2018.01) |
| G06F 8/60 | (2018.01) |
| G06F 9/445 | (2018.01) |
| G06F 9/48 | (2006.01) |
| G06F 11/30 | (2006.01) |
| H04L 67/00 | (2022.01) |

(52) U.S. Cl.
CPC ............ G06F 9/44505 (2013.01); G06F 8/60 (2013.01); G06F 9/4856 (2013.01); G06F 11/3006 (2013.01); H04L 67/34 (2013.01)

(58) Field of Classification Search
CPC .................................................. G06F 9/44505
USPC ......................................................... 717/177
See application file for complete search history.

(56) References Cited

U.S. PATENT DOCUMENTS

| | | | | |
|---|---|---|---|---|
| 4,309,569 A | * | 1/1982 | Merkle | H04L 9/3247 713/180 |
| 6,963,908 B1 | * | 11/2005 | Lynch | G06F 9/44505 709/221 |
| 8,966,471 B2 | * | 2/2015 | Boudreau | G06F 8/62 717/174 |

(Continued)

FOREIGN PATENT DOCUMENTS

| | | | | |
|---|---|---|---|---|
| CN | 106502688 A | * | 3/2017 | ............... G06F 8/71 |
| CN | 110413318 A | | 11/2019 | |
| WO | 2019113216 A1 | | 6/2019 | |

OTHER PUBLICATIONS

Klein, J., "Infrastructure as Code: Moving Beyond DevOps and Agile," Carnegie Mellon University, Jun. 11, 2018, https://insights.sei.cmu.edu/sei_blog/2018/06/infrastructure-as-code-moving-beyond-devops-and-agile.html.

(Continued)

*Primary Examiner* — Evral E Bodden
(74) *Attorney, Agent, or Firm* — Kilpatrick Townsend & Stockton LLP (57) ABSTRACT

Software and system settings can be migrated between computing environments. In one example, a system can receive a group of software identification modules defining a group of software fingerprints for detecting a group of software components. Each software identification module can include a respective software fingerprint for detecting a respective software component. The system can determine that a source computing environment includes one or more software components from within the group of software components by analyzing the source computing environment using each respective software fingerprint in the group of software fingerprints. The system may then deploy the one or more software components in a target computing environment.

17 Claims, 4 Drawing Sheets

(56) References Cited

U.S. PATENT DOCUMENTS

| | | | | |
|---|---|---|---|---|
| 9,032,392 | B2* | 5/2015 | Glover | G06F 16/2457 |
| | | | | 717/176 |
| 9,250,672 | B2* | 2/2016 | DeHaan | G06F 8/63 |
| 9,361,092 | B1 | 6/2016 | Bai et al. | |
| 9,454,365 | B2* | 9/2016 | Oberheide | G06F 9/44505 |
| 9,465,643 | B1 | 10/2016 | Andrews et al. | |
| 9,594,590 | B2 | 3/2017 | Hsu | |
| 9,612,765 | B2 | 4/2017 | Huang et al. | |
| 9,792,306 | B1* | 10/2017 | Wartnick | G06F 16/1752 |
| 9,928,099 | B1* | 3/2018 | Surani | H04L 41/0897 |
| 10,331,439 | B2* | 6/2019 | Kim | G06F 8/71 |
| 10,379,910 | B2 | 8/2019 | Balasubramanian et al. | |
| 10,484,419 | B1* | 11/2019 | Davis | G06F 21/564 |
| 10,581,462 | B2* | 3/2020 | Ge | H04L 1/0058 |
| 10,783,123 | B1* | 9/2020 | Iacoletti | G06F 16/211 |
| 2016/0098265 | A1* | 4/2016 | Mahajan | G06F 8/65 |
| | | | | 717/170 |
| 2019/0324786 | A1 | 10/2019 | Ranjan et al. | |
| 2020/0351076 | A1* | 11/2020 | Scott | H04L 9/3239 |
| 2021/0273813 | A1* | 9/2021 | Landman | H04L 9/3247 |

OTHER PUBLICATIONS

"Machinery—A Systems Management Toolkit for Linux," downloaded Mar. 4, 2020, http://machinery-project.org/.

\* cited by examiner

FIG. 1

```
amf_as_services: ["httpd"]

amf_as_user_group:
 users: ["apache"]
 groups: ["apache"]

amf_as_paths:
 - "/usr/local/apache2"
 - "/var/http/www"

# include package name, version, or both
amf_as_packages: ["httpd-2.4.6-88", "httpd-2.5.1-99"]

# ports list
amf_as_ports: [ "80", "443"]

amf_as_processes:
 - "/usr/local/apache2/bin/httpd"

amf_as_scores:
 users: "1"
 groups: "1"
 services: "0"
 paths: "1"
 packages: "1"
 ports: "2"
 processes: "1"

# Returned fields
amf_as_discovered_app:
 name: "Apache HTTP Server"
 desc: "Hosts identified as Apache HTTP Server"
```

MIGRATING SOFTWARE AND SYSTEM SETTINGS BETWEEN COMPUTING ENVIRONMENTS

TECHNICAL FIELD

The present disclosure relates generally to migrating data between computing environments. More specifically, but not by way of limitation, this disclosure relates to migrating software and system settings between computing environments.

BACKGROUND

Migration is the process of moving data from a source computing environment to a target computing environment. The target computing environment generally has different characteristics (e.g., a different operating system or node topology) than the source computing environment, with the purpose of the migration being to take advantage of those different characteristics. For example, a system administrator may migrate software from an on-premises server to a cloud computing environment to take advantage of various improvements to scaling, reliability, and affordability provided by cloud computing architectures. As another example, a system administrator may migrate software from a computing cluster running an older version of Red Hat Enterprise Linux (RHEL) to another computing cluster running a newer version of RHEL, which may provide improved stability or enhanced features relative to the older version.

DETAILED DESCRIPTION

Migrating data (e.g., software components, files, databases, etc.) between computing environments is often a complex process that requires a significant amount of time and manual labor. For example, a migration process typically begins with a system administrator manually identifying all of the data to be migrated from a source computing environment to a target computing environment. But this manual process is slow and error prone, because system administrators generally look to the same few sources to identify the data, and those sources often provide incomplete information. For example, the system administrator may reference a software management system to determine what software components (e.g., applications, packages, and binaries) are installed on the source computing environment. But since the software management system only has information about software components that it installed, the software management system cannot provide any information about other software components installed using other means. This may cause the system administrator to accidentally miss the other software altogether in the migration, which can lead to errors, failures, and other problems. And even if the system administrator is able to properly identify the migration data, the system administrator must then actually perform the migration. Such migrations typically involve manually transferring the identified data from the source computing environment to the target computing environment, which can be a slow process. Such migrations also typically involve the complex and time consuming process of configuring the target computing environment to be compatible with the migrated data.

Some aspects and features of the present disclosure can overcome one or more of the abovementioned problems by using automated migration software that can analyze a source computing environment to automatically (e.g., with little or no user involvement) identify data to be migrated to a target computing environment. The automated migration software can then automatically perform the migration process and configure the target computing environment appropriately. In this way, the automated migration software can reduce errors and perform faster migrations than conventional approaches.

As one particular example, the automated migration software can ingest a group of software identification modules. Each software identification module can define a respective software fingerprint usable for detecting a respective software component in a source computing environment. A software fingerprint is a data structure that specifies a combination of computing resources (e.g., processes, filesystem paths, network ports, services, packages, users, user groups, and variables) or computing-resource values that indicate the presence of a particular software component in a computing environment. For example, a software fingerprint can include a list of computing resources, where the presence of some or all of the computing resources in a computing environment is a strong indicator of a particular software component in the computing environment. The automated migration software can analyze the source computing environment using each respective software fingerprint to determine if the corresponding software component is present in the source computing environment. The automated migration software can add each software component determined to be present in the source computing environment to a list, thereby generating a comprehensive list of software components in the source computing environment. The automated migration software may then automatically deploy the identified software components in a target computing environment.

In some examples, the automated migration software can determine if a software component is present in the source computing environment by generating a score for the software component using its corresponding software fingerprint. For example, the automated migration software can determine the score based on how many of the identifying features (e.g., computing resources and computing resource values) specified in the software fingerprint are present in the source computing environment. The automated migration software can then determine if the score exceeds a predefined threshold value. If so, the automated migration software can determine that the source computing environment includes the software component. Otherwise, the automated migration software can determine that the source computing environment excludes the software component. The automated migration software can repeat this process using each software fingerprint to generate a list. The list can indicate software components present in the source computing environment, other software components absent from the source computing environment, or a combination of these.

The automated migration software may additionally or alternatively perform a similar process to determine system settings of the source computing environment and automatically configure the target computing environment to have those system settings. For example, the automated migration software can receive a group of setting identification modules, which are different from the software identification modules. Each setting identification module can define a respective setting fingerprint usable for detecting a respective system setting in the source computing environment. A setting fingerprint is a data structure specifying a combination of computing resources or computing-resource values that indicates the presence of a particular system setting in a computing environment. For example, a setting fingerprint can include a list of computing resources, where the presence of some or all of the computing resources in a computing environment is a strong indicator of a particular system setting in the computing environment. The automated migration software can analyze the source computing environment using each respective setting fingerprint to determine if the source computing environment has the corresponding system setting. The automated migration software can add each identified system setting to a list, thereby generating a comprehensive list of system settings in the source computing environment. The automated migration software can then automatically configure the target computing environment to have the identified system settings.

In some examples, the various modules can be self-contained units (e.g., files or plugins) that are downloadable from an online repository for use by the automated migration software. The online repository can be maintained by a community of developers, who can continuously add and update modules to provide a robust system for automating migrations.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
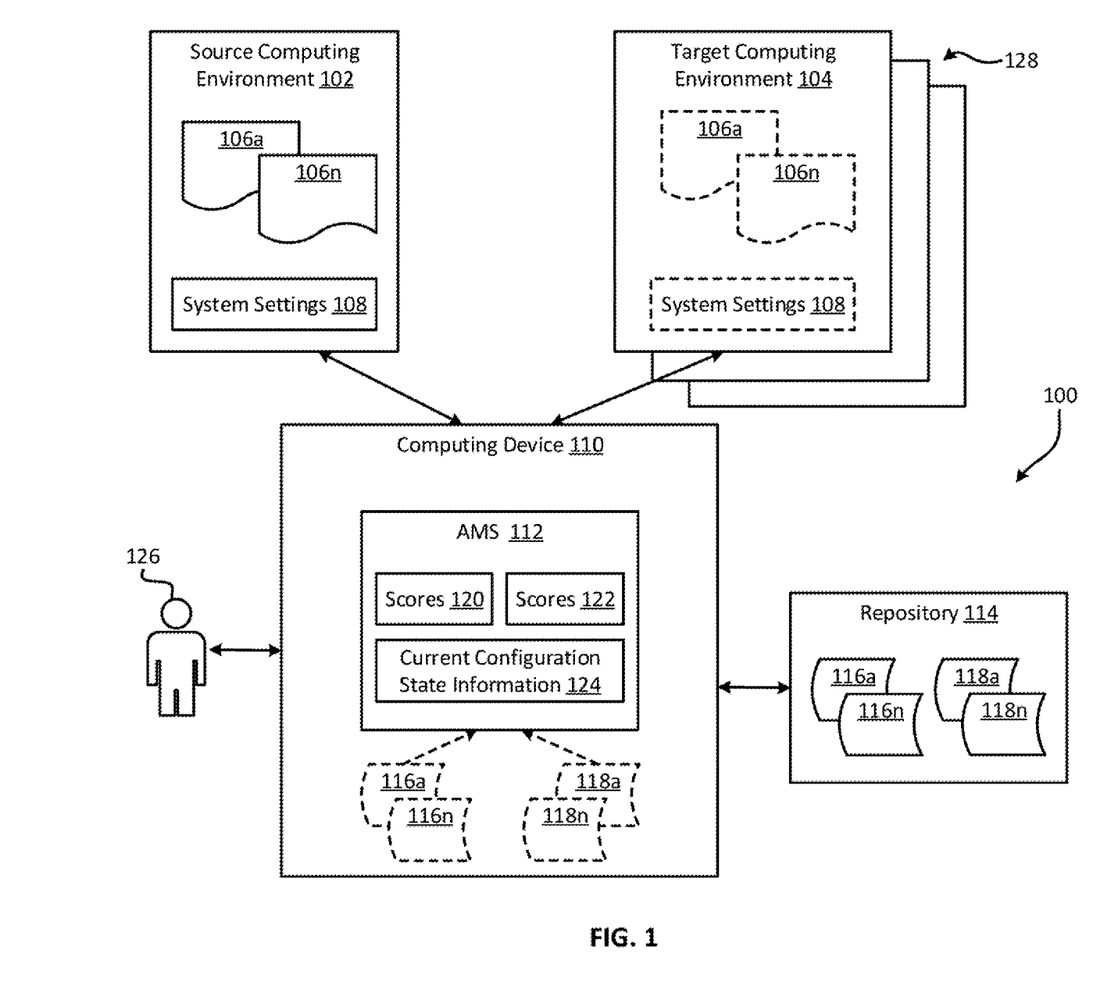
FIG. 1 is a block diagram of an example of a system for migrating software and system settings between computing environments according to some aspects of the present disclosure.

FIG. 1 is a block diagram of an example of a system 100 for migrating software and system settings between computing environments according to some aspects of the present disclosure. The system 100 includes a source computing environment 102 and a target computing environment 104. The target computing environment 104 is separate from the source computing environment 102 and has at least one characteristic (e.g., hardware or software characteristic) that is different from the source computing environment 102. For example, the target computing environment 104 may have a different operating system, a different amount of memory, or different processing capabilities than the source computing environment 102. A user 126 may wish to migrate data from the source computing environment 102 to the target computing environment 104 to leverage these differences.

The system 100 can also include a computing device 110 that can assist with performing migrations. Although the computing device 110 is shown in FIG. 1 as being separate from the source computing environment 102 and the target computing environment 104, in other examples the computing device 110 may be part of the source computing environment 102 or the target computing environment 104. Regardless of its location, the computing device 110 can communicate with (e.g., via one or more networks) the source computing environment 102, the target computing environment 104, or both of these to assist in a migration process.

The computing device 110 can include software identification modules 116a-n. The computing device 110 can obtain the software identification modules 116a-n from a repository 114. This is represented in FIG. 1 by the dashed versions of the software identification modules 116a-n on the computing device 110. The repository 114 may be an online repository accessible to the computing device 110 via the Internet, or may be a local repository accessible to the computing device 110 via a local network connection. The software identification modules 116a-n can define software fingerprints usable for detecting software components 106a-n in the source computing environment 102. For example, each of the software identification modules 116a-n can define a respective software fingerprint usable for detecting a respective software component 106a-n in the source computing environment 102.

The computing device 110 can also include automated migration software (AMS) 112. The AMS 112 can analyze the source computing environment 102 using each respective software fingerprint to determine if the corresponding software component is present in the source computing environment 102. For example, the AMS 112 can analyze the source computing environment 102 using a software fingerprint defined by software identification module 116a to determine if the corresponding software component 106a is present in the source computing environment 102. The AMS 112 can also analyze the source computing environment 102 using a software fingerprint defined by software identification module 116n to determine if the corresponding software component 106n is present in the source computing environment 102. And so on. The AMS 112 can then add each software component determined to be present in the source computing environment to current configuration state information 124. In this way, the AMS 112 can determine the software components that are installed or running in the source computing environment 102.

In some examples, the AMS 112 can determine if a software component is present in the source computing environment 102 by generating a score for the software component using its corresponding software fingerprint. For example, the AMS 112 can analyze the source computing environment 102 for a software component 106 using a corresponding software fingerprint that includes a list of computing resources that are indicative of the software component 106. To perform this analysis, the AMS 112 can determine if the source computing environment 102 includes each computing resource on the list. The AMS 112 can then generate a score depending on how many of the computing resources on the list are present in the source computing environment 102. For example, the AMS 112 may increase the score by 1 for each of the computing resources on the list that are determined to be present in the source computing environment 102. In this way, the AMS 112 may determine a higher score if more of the computing resources are present in the source computing environment 102 and a lower score if fewer of the computing resource are present in the source computing environment 102.

Additionally or alternatively, the AMS 112 can generate the score by weighting at least one computing resource on the list more heavily than the other computing resources on the list. For example, each computing resource on the list can have an assigned numeric value, which may depend on how strongly the computing resource indicates the presence of the software component 106. Since some computing resources on the list may more strongly indicate the presence of the software component 106 than other computing resources on the list, some of the computing resources on the list may be assigned higher numeric value than others. For example, one computing resource on the list may be assigned a numeric value of 0.73 while another computing resource on the list may be assigned a numeric value 0.24. The AMS 112 can then generate the score by based on the numeric values assigned to the computing resources identified in the source computing environment 102.

After generating a score for the software component 106*a*, the AMS 112 can determine if the score for the software component 106*a* exceeds a predefined threshold value (e.g., 5). If the score exceeds the predefined threshold value, the AMS 112 can determine that the source computing environment 102 includes the software component 106*a* and add the software component 106*a* to the current configuration state information 124. If the score does not exceed the predefined threshold value, the AMS 112 can determine that the source computing environment 102 does not include the software component 106*a* and forego adding the software component 106*a* to the current configuration state information 124.

The AMS 112 can perform the above process using any number and combination of software identification modules 116*a-n*, to obtain any number and combination of scores 120. The AMS 112 can then use the scores 120 to determine the software components 106*a-n* to be added to the current configuration state information 124.

In some examples, the computing device 110 can additionally or alternatively obtain any number and combination of setting identification modules 118*a-n* from the repository 114. The setting identification modules 118*a-n* can define setting fingerprints usable for detecting one or more system settings 108 in the source computing environment 102. For example, each of the setting identification modules 118*a-n* can define a respective setting fingerprint usable for detecting a respective system setting in the source computing environment 102. The AMS 112 can then analyze the source computing environment 102 using each respective system setting fingerprint to determine if the corresponding system setting is present in the source computing environment 102. For example, the AMS 112 can analyze the source computing environment 102 using a setting fingerprint defined by setting identification module 118*a* to determine if its corresponding system setting is present in the source computing environment 102. The AMS 112 can also analyze the source computing environment 102 using a setting fingerprint defined by setting identification module 118*n* to determine if its corresponding system setting is present in the source computing environment 102. And so on. The AMS 112 can then add each system setting determined to be present in the source computing environment to the current configuration state information 124.

In some examples, the AMS 112 can determine if a system setting is present in the source computing environment 102 by generating a score for the system setting using its corresponding setting fingerprint. For example, the AMS 112 can analyze the source computing environment 102 for a system setting using a corresponding setting fingerprint that includes a list of computing resources that are indicative of the system setting. To perform this analysis, the AMS 112 can determine if the source computing environment 102 includes each computing resource on the list. The AMS 112 can then generate a score depending on how many of the computing resources on the list are present in the source computing environment 102. For example, the AMS 112 may increase the score by 1 for each of the computing resources on the list that are determined to be present in the source computing environment 102. In this way, the AMS 112 may determine a higher score if more of the computing resources are present in the source computing environment 102 and a lower score if fewer of the computing resource are present in the source computing environment 102.

Additionally or alternatively, the AMS 112 can generate the score by weighting at least one computing resource on the list more heavily than the other computing resources on the list. For example, each computing resource on the list can have an assigned numeric value, which may depend on how strongly the computing resource indicates the presence of the system setting. Since some computing resources on the list may more strongly indicate the presence of the system setting than other computing resources on the list, some of the computing resources on the list may be assigned higher numeric value than others. For example, one computing resource on the list may be assigned a numeric value of 0.73 while another computing resource on the list may be assigned a numeric value 0.24. The AMS 112 can then generate the score by based on the numeric values assigned to the computing resources identified in the source computing environment 102.

After generating score for the system setting, the AMS 112 can determine if the score for the system setting exceeds a predefined threshold value (e.g., 5). If the score exceeds the predefined threshold value, the AMS 112 can determine that the source computing environment 102 includes the system setting and add the system setting to the current configuration state information 124. If the score does not exceed the predefined threshold value, the AMS 112 can determine that the source computing environment 102 does not include the system setting and forego adding the system setting to the current configuration state information 124.

The AMS 112 can perform the above process using any number and combination of setting identification modules 118*a-n*, to obtain any number and combination of scores 122. The AMS 112 can then use the scores 122 to determine the system settings 108 to be added to the current configuration state information 124.

The current configuration state information 124 can indicate the current configuration state of the source computing environment 102 as of the particular point in time in which the AMS 112 performed its analyses. The current configuration state information 124 can include the software components 106*a-n* installed in the source computing environment 102 as of that particular point in time, the system settings 108 of the source computing environment 102 as of that particular point in time, or both of these. In some examples, the AMS 112 may output the current configuration state information 124 in a graphical user interface, which may be part of a web application accessible to the user 126 via a website browser. This can enable the user 126 to easily determine the current configuration state of the source computing environment 102, which may be useful for a migration process or for other purposes.

In some examples, the AMS 112 can execute some or all of a migration process based on the current configuration state information 124. For example, the user 126 can select a target computing environment 104 from among a group of candidate target computing environments 128. The AMS 112 can then deploy the software components 106*a-n* associated with the current configuration state information 124 on the target computing environment 104. The AMS 112 may additionally or alternatively configure the target computing environment 104 based on the system settings 108 associated with the current configuration state information 124. This is represented in FIG. 1 by the dashed versions of software components 106a-n and the system settings 108 in the target computing environment 104.

Deploying a software component on a target computing environment 104 may involve communicating with the target computing environment 104 so as to cause the software component to be installed, compiled, and run in the target computing environment 104. For example, the processor 302 can transmit one or more commands to the target computing environment 104, where the one or more commands are configured for causing the software component to be deployed on the target computing environment 104. In response to receiving the one or more commands, the target computing environment 104 can perform one or more deployment operations, such as downloading, compiling, installing, and running the software component. In some examples, deploying a software component on a target computing environment 104 may additionally or alternatively involve obtaining an installation package for the software component (e.g., downloading the installation package from the Internet) and transferring the installation package to the target computing environment 104, so that the software component can be installed on the target computing environment 104. Deploying a software component on a target computing environment 104 may additionally or alternatively involve obtaining stored data associated with the software component from the source computing environment 102 and transferring the stored data to the target computing environment 104. Examples of the stored data can include database data, configuration data, user preference data, usage pattern data, or any combination of these. In some examples, the AMS 112 can locate the stored data in the source computing environment 102 based on information in the software identification modules 116a-n. For instance, each of the software identification modules 116a-n may include a name or path associated with locations from which the stored data can be retrieved in the source computing environment 102.

Configuring a target computing environment 104 based on (e.g., to have) a system setting can involve communicating with the target computing environment 104. For example, the processor 302 can determine one or more commands based on the system setting and transmit the one or more commands to the target computing environment 104. In response to receiving the one or more commands, the target computing environment 104 can perform one or more configuration operations for causing itself to have the system setting.

While the current configuration state information 124 is described above as being useful for performing a migration, the current configuration state information 124 can also be used for other purposes. For example, the current configuration state information 124 can be used to perform a "health check" on the source computing environment 102. A health check can involve comparing the current configuration state of the source computing environment 102 against a desired configuration state (or "benchmark"), to determine how much the current configuration state deviates from the benchmark. Significant or important deviations from the benchmark may indicate potential problems with the source computing environment 102 that warrant closer analysis by the user 126. The computing device 110 may perform such a health check based on the current configuration state information 124, in some examples.

It will be appreciated that although FIG. 1 depicts particular arrangements and amounts of components (e.g., source computing environment 102, target computing environment 104, computing device 110, AMS 112, software identification modules 116a-n, etc.), other examples can involve other arrangements and amounts of such components.

Figure 2:
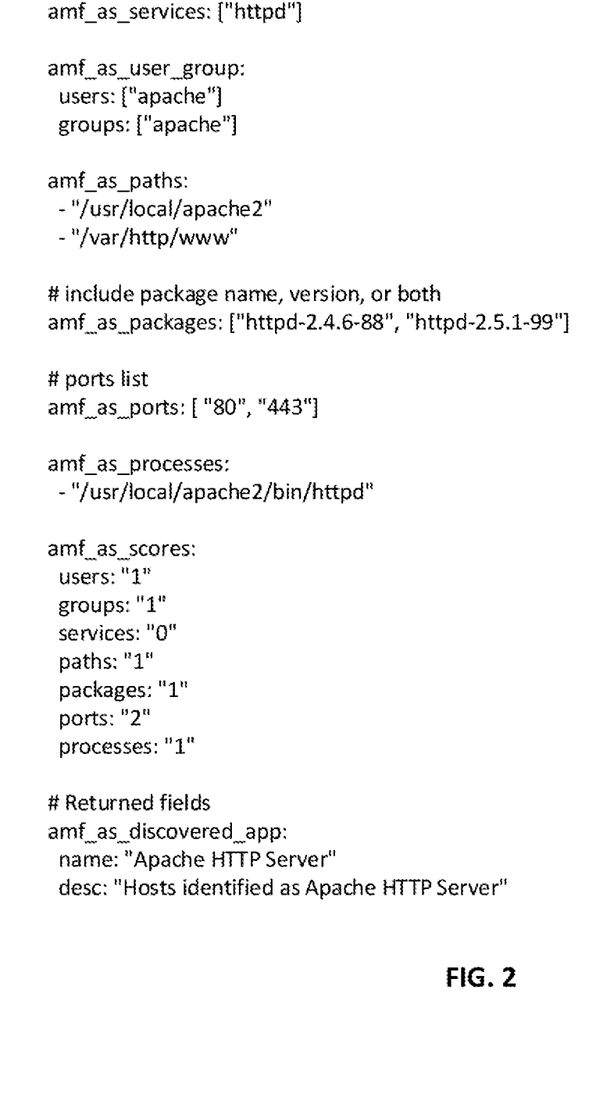
FIG. 2 is an example of a software fingerprint according to some aspects of the present disclosure.

FIG. 2 is an example of a software fingerprint 200 according to some aspects of the present disclosure. In this example, the software fingerprint 200 is for identifying an Apache HTTP Server (AHTTPS). The software fingerprint 200 specifies a combination of computing resources indicating the presence of the AHTTPS.

More specifically, the software fingerprint 200 first includes a services definition specifying one or more services indicative of the AHTTPS, e.g., the "httpd" service. Next, the software fingerprint 200 includes a users/groups definition specifying one or more users and one or more groups indicative of the AHTTPS, e.g., a user with the name "apache" and a group with the name "apache." The software fingerprint 200 additionally includes a paths definition specifying one or more filesystem paths indicative of the AHTTPS, e.g., the "/usr/local/apache2" path and the "/var/http/www" path. Next, the software fingerprint 200 includes a packages definition specifying one or more packages indicative of the AHTTPS, e.g., the httpd-2.4.6-88 package and the httpd-2.5.1-99 package. These packages may be identified by their name, version, or both. In the example shown in FIG. 2, the packages are specified by both name and version number. Moving on, the software fingerprint 200 next includes a ports definition specifying one or more ports indicative of the AHTTPS, e.g., port 80 and port 443. Finally, the software fingerprint 200 includes a processes definition specifying one or more processes indicative of the AHTTPS, e.g., the "/usr/local/apache2/bin/httpd" process.

In some examples, the software fingerprint 200 can also define a scoring system. In this example, the scoring system specifies the minimum computing resources required to be present in the source computing environment in order to detect the presence of the AHTTPS (e.g., with a high degree of confidence). As shown, the minimum computing resources includes one of the users specified in the users/groups definition, one of the groups specified in the users/groups definition, one of the paths specified in the paths definition, one of the packages specified in the packages definition, both of the ports specified in the ports definition, and one of the processes specified in the processes definition. But other examples can include a different number, arrangement, and selection of computing resources. If the source computing environment has at least the specified computing resources, then there is a higher likelihood that the source computing environment has the AHTTPS. And if the source computing environment does not have at least these computing resources, then there is a lower likelihood that the source computing environment has the AHTTPS.

In some examples, the software fingerprint 200 can further include return fields specifying one or more return outputs to supply to the automated migration software (AMS). The return output(s) may include a name of the software component (e.g., "Apache HTTP Server") identified using the software fingerprint 200, a description of the software component (e.g., "Hosts identified as Apache HTTP server"), or both of these.

It will be appreciated that the software fingerprint 200 depicted in FIG. 2 is intended to be illustrative and non-limiting. Other examples may involve more information, less information, different information, or a different order of the information than is shown in FIG. 2. Likewise, the scoring system shown in FIG. 2 is intended to be illustrative and non-limiting, and other examples may involve a different type of scoring system.

Figure 3:
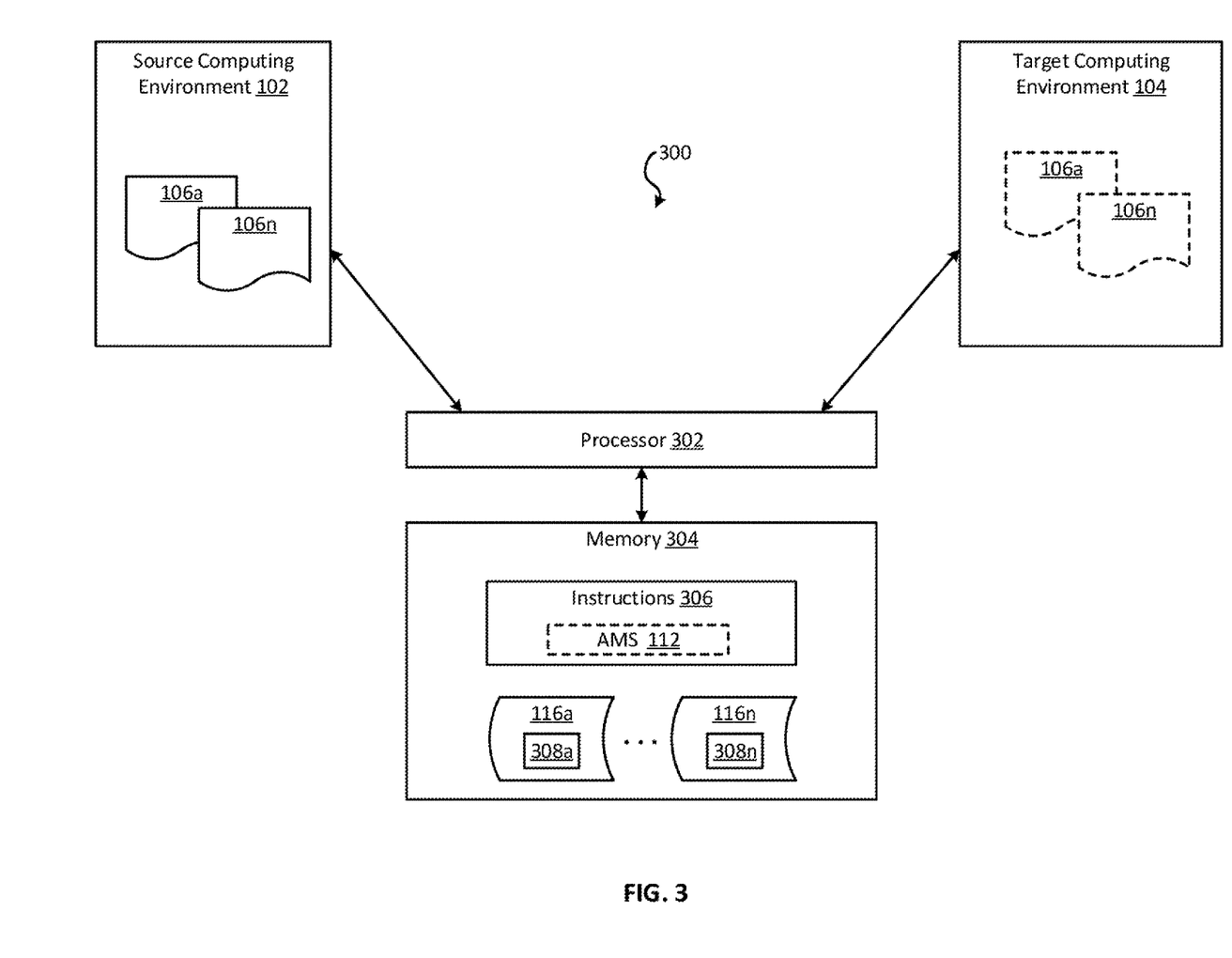
FIG. 3 is a block diagram of another example of a system for migrating software and system settings between computing environments according to some aspects of the present disclosure.

FIG. 3 is a block diagram of another example of a system 300 for migrating software and system settings between computing environments according to some aspects of the present disclosure. The system 300 includes a processor 302 communicatively coupled to a memory 304. The processor 302 and the memory 304 may both be included in a single housing (e.g., computing device 110 of FIG. 1) or distributed from one another.

The processor 302 can include one processor or multiple processors. Non-limiting examples of the processor 302 include a Field-Programmable Gate Array (FPGA), an application-specific integrated circuit (ASIC), a microprocessor, etc. The processor 302 can execute instructions 306 stored in the memory 304 to perform operations. In some examples, the instructions 306 can include processor-specific instructions generated by a compiler or an interpreter from code written in any suitable computer-programming language, such as C, C++, C #, etc. In some examples, the instructions 306 may correspond to the AMS 112 described above with regard to FIG. 1.

The memory 304 can include one memory device or multiple memory devices. The memory 304 can be non-volatile and may include any type of memory device that retains stored information when powered off. Non-limiting examples of the memory 304 include electrically erasable and programmable read-only memory (EEPROM), flash memory, or any other type of non-volatile memory. At least some of the memory device includes a non-transitory computer-readable medium. A non-transitory computer-readable medium can include electronic, optical, magnetic, or other storage devices capable of providing the processor 302 with the instructions 306 or other program code. Non-limiting examples of a non-transitory computer-readable medium include magnetic disk(s), memory chip(s), ROM, random-access memory (RAM), an ASIC, a configured processor, optical storage, or any other medium from which a computer processor can read the instructions 306.

In some examples, the processor 302 can perform some or all of the functionality described herein by executing the instructions 306. For example, the processor 302 can receive a plurality of software identification modules 116a-n defining a plurality of software fingerprints 308a-n for detecting a plurality of software components 106a-n. Each software identification module can include a respective software fingerprint for detecting a respective software component among the plurality of software components 106a-n. The processor 302 can determine that a source computing environment 102 includes one or more software components from among the plurality of software components 106a-n by analyzing the source computing environment 102 using each respective software fingerprint among the plurality of software fingerprints 308a-n. The one or more software components can include some, or all, of the plurality of software components 106a-n. The processor 302 can then deploy the identified one or more software components in a target computing environment 104 that is separate from the source computing environment 102.

Figure 4:
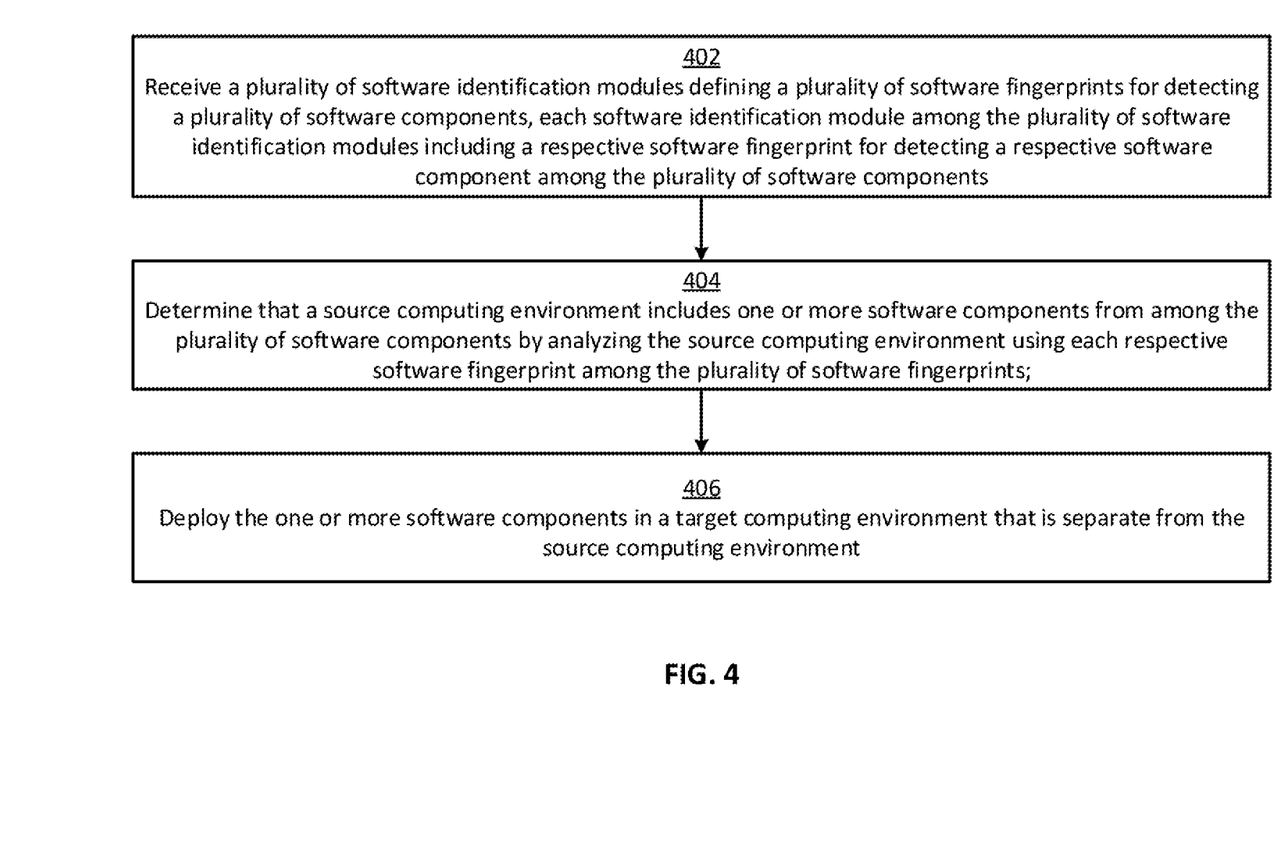
FIG. 4 a flow chart of an example of a process for migrating software and system settings between computing environments according to some aspects of the present disclosure.

FIG. 4 a flow chart of an example of a process for migrating software and system settings between computing environments according to some aspects of the present disclosure. While FIG. 4 depicts a certain sequence of steps for illustrative purposes, other examples can involve more steps, fewer steps, different steps, or a different order of the steps than is depicted in FIG. 4. The steps of FIG. 4 are described below with reference to components of FIG. 3.

In block 402, a processor 302 receives a plurality of software identification modules 116a-n defining a plurality of software fingerprints 308a-n for detecting a plurality of software components 106a-n. Each software identification module can include a respective software fingerprint for detecting a respective software component among the plurality of software components 106a-n.

In block 404, the processor 302 determines that a source computing environment 102 includes one or more software components from among the plurality of software components 106a-n. The processor 302 can make this determination by analyzing the source computing environment 102 using each respective software fingerprint among the plurality of software fingerprints 308a-n provided in the plurality of software identification modules 116a-n. For example, the processor 302 can determine a software fingerprint corresponding to a software component among the plurality of software components 106a-n. The processor 302 can then generate a score for the software component based on one or more commonalities (e.g., matches) between the source computing environment 102 and the software fingerprint. Based on the score, the processor 302 can determine if the source computing environment includes the software component. The processor 302 can repeat this process for each software component in the plurality of software components 106a-n.

In block 406, the processor 302 deploys the one or more software components in a target computing environment 104 that is separate from the source computing environment 102. Deploying a software component on a target computing environment 104 can involve communicating with the target computing environment 104 so as to cause the software component to be installed, compiled, and/or run in the target computing environment 104. For example, the processor 302 can transmit one or more commands to the target computing environment 104 configure to cause the target computing environment 104 to download, compile, install, and/or run the software component. Deploying a software component on a target computing environment 104 can additionally or alternatively involve transferring stored data associated with the software component from the source computing environment 102 to the target computing environment 104.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

The invention claimed is:

1. A system comprising:
   a processor; and
   a memory comprising instructions that are executable by the processor for causing the processor to perform operations, wherein the operations are for migrating one or more software components from a source computing environment to a target computing environment, and wherein the operations include:
      receiving a plurality of software identification modules from an online repository, the plurality of software identification modules being generated by developers independently of the source computing environment and uploaded to the online repository by the developers, the plurality of software identification modules defining a plurality of software fingerprints for detecting a plurality of software components in the source computing environment, each software identification module among the plurality of software identification modules including a respective software fingerprint that includes a respective list of computing resources that are separate from and indicative of a respective software component of the plurality of software components, the respective software fingerprint being configured for detecting a respective software component among the plurality of software components in the source computing environment;

determining that the source computing environment includes the one or more software components from among the plurality of software components by analyzing the source computing environment using each respective software fingerprint among the plurality of software fingerprints, wherein determining that the source computing environment includes the one or more software components involves:

for each respective software component among the one or more software components:
generating a respective score for the respective software component based on one or more commonalities between (i) the source computing environment and (ii) the respective software fingerprint corresponding to the respective software component; and
determining that the source computing environment includes the respective software component based on the respective score; and deploying the one or more software components in the target computing environment, the target computing environment being separate from the source computing environment.

2. The system of claim 1, wherein the respective software fingerprint is a data structure that specifies a list of computing resources indicating a presence of the respective software component in a computing environment, and wherein the memory further comprises instructions that are executable by the processor for causing the processor to generate the respective score based on how many of the computing resources on the list are present in the source computing environment.

3. The system of claim 2, wherein the list of computing resources includes at least two computing resources selected from a group of computing resources consisting of a process, a filesystem path, a port, a service, a package, a user, or a user group.

4. The system of claim 1, wherein the memory further comprises instructions that are executable by the processor for causing the processor to download the plurality of software identification modules from the online repository.

5. The system of claim 1, wherein the source computing environment has a different operating system than the target computing environment.

6. The system of claim 1, wherein the memory further comprises instructions that are executable by the processor for causing the processor to:
receive a plurality of setting identification modules defining a plurality of setting fingerprints for detecting a plurality of system settings, each setting identification module among the plurality of setting identification modules including a respective setting fingerprint for detecting a respective system setting among the plurality of system settings;
determine that the source computing environment includes one or more system settings from among the plurality of system settings by analyzing the source computing environment using each respective setting fingerprint among the plurality of setting fingerprints; and
configure the target computing environment based on the one or more system settings.

7. A method comprising:
performing, by one or more processors, operations for migrating one or more software components from a source computing environment to a target computing environment, the operations comprising:
receiving a plurality of software identification modules from an online repository, the plurality of software identification modules being generated by developers independently of the source computing environment and uploaded to the online repository by the developers, the plurality of software identification modules defining a plurality of software fingerprints for detecting a plurality of software components in the source computing environment, each software identification module among the plurality of software identification modules including a respective software fingerprint that includes a respective list of computing resources that are separate from and indicative of a respective software component of the plurality of software components, the respective software fingerprint being configured for use in detecting a presence of the respective software component in the source computing environment;
determining that the source computing environment includes the one or more software components from among the plurality of software components by analyzing the source computing environment using each respective software fingerprint among the plurality of software fingerprints, wherein determining that the source computing environment includes the one or more software components involves:
for each respective software component among the one or more software components:
generating a respective score for the respective software component based on one or more commonalities between (i) the source computing environment and (ii) the respective software fingerprint corresponding to the respective software component; and
determining that the source computing environment includes the respective software component based on the respective score; and
deploying the one or more software components in the target computing environment, the target computing environment being separate from the source computing environment.

8. The method of claim 7, further comprising generating the respective score for the respective software component based on how many of the computing resources on the respective list of computing resources associated with the respective software fingerprint are present in the source computing environment.

9. The method of claim 8, wherein the respective list of computing resources includes any combination of a process, a filesystem path, a port, a service, a package, a user, a user group, or a variable that are associated with the respective software component.

10. The method of claim 7, further comprising downloading the plurality of software identification modules from the online repository.

11. The method of claim 7, wherein the source computing environment has a different operating system than the target computing environment.

12. The method of claim 7, further comprising:
receive a plurality of setting identification modules defining a plurality of setting fingerprints for detecting a plurality of system settings, each setting identification module among the plurality of setting identification modules including a respective setting fingerprint for detecting a respective system setting among the plurality of system settings;
determine that the source computing environment includes one or more system settings from among the plurality of system settings by analyzing the source computing environment using each respective setting fingerprint among the plurality of setting fingerprints; and
configure the target computing environment based on the one or more system settings.

13. A non-transitory computer-readable medium comprising program code that is executable by a processor for causing the processor to perform operations, wherein the operations are for migrating one or more software components from a source computing environment to a target computing environment, and wherein the operations include:
receiving a plurality of software fingerprints from an online repository, the plurality of software fingerprints being generated by one or more developers independently of the source computing environment and uploaded to the online repository by the one or more developers independently of the operations, the plurality of software fingerprints being for detecting a plurality of software components in the source computing environment, wherein each respective software fingerprint of the plurality of software fingerprints includes a respective list of computing resources that are separate from and indicative of a respective software component of the plurality of software components, the respective software fingerprint being configured for detecting a presence of the respective software component in the source computing environment;
determining that the source computing environment includes the one or more software components from among the plurality of software components by analyzing the source computing environment using each respective software fingerprint among the plurality of software fingerprints, wherein determining that the source computing environment includes the one or more software components involves:
for each respective software component among the one or more software components:
generating a respective score for the respective software component based on one or more commonalities between (i) the source computing environment and (ii) the respective software fingerprint corresponding to the respective software component; and
determining that the source computing environment includes the respective software component based on the respective score; and
deploying the one or more software components in the target computing environment, the target computing environment being separate from the source computing environment.

14. The non-transitory computer-readable medium of claim 13, wherein a software fingerprint among the plurality of software fingerprints includes a list of computing resources that are indicative of a software component of the plurality of software components, and further comprising program code that is executable by the processor for causing the processor to generate a score associated with the software fingerprint based on how many of the computing resources on the list are present in the source computing environment.

15. The non-transitory computer-readable medium of claim 14, wherein the list of computing resources includes a process, a filesystem path, a port, a service, a package, a user, a user group, or a variable associated with the software component.

16. The non-transitory computer-readable medium of claim 13, further comprising program code that is executable by the processor for causing the processor to download the plurality of software fingerprints from the online repository.

17. The non-transitory computer-readable medium of claim 13, wherein the source computing environment has a different operating system than the target computing environment.

* * * * *